US012020836B2

(12) United States Patent
Miura et al.

(10) Patent No.: US 12,020,836 B2
(45) Date of Patent: Jun. 25, 2024

(54) R-T-B BASED PERMANENT MAGNET AND MOTOR

(71) Applicant: TDK CORPORATION, Tokyo (JP)

(72) Inventors: Koji Miura, Tokyo (JP); Masashi Miwa, Tokyo (JP)

(73) Assignee: TDK CORPORATION, Tokyo (JP)

( * ) Notice: Subject to any disclaimer, the term of this patent is extended or adjusted under 35 U.S.C. 154(b) by 421 days.

(21) Appl. No.: 17/356,178

(22) Filed: Jun. 23, 2021

(65) Prior Publication Data

US 2021/0407714 A1 Dec. 30, 2021

(30) Foreign Application Priority Data

Jun. 24, 2020 (JP) ................................ 2020-108717

(51) Int. Cl.
*H01F 1/057* (2006.01)
*C22C 38/00* (2006.01)

(52) U.S. Cl.
CPC ......... *H01F 1/0577* (2013.01); *C22C 38/005* (2013.01)

(58) Field of Classification Search
CPC . H01F 1/053; H01F 7/02; H01F 1/057; C22C 38/005
See application file for complete search history.

(56) References Cited

U.S. PATENT DOCUMENTS 6,468,365 B1 10/2002 Uchida et al.
2006/0201585 A1 9/2006 Tomizawa et al.
2012/0229240 A1 9/2012 Yoshimura et al.
2018/0158582 A1 6/2018 Masusawa et al.
2018/0277288 A1* 9/2018 Iwasaki .................. H01F 1/057

FOREIGN PATENT DOCUMENTS

CN 108154988 A 6/2018
DE 699 11 138 T2 7/2004
JP S63-62842 A 3/1988
JP H03-148803 A 6/1991
JP 2014027268 A * 2/2014
JP 2018-93202 A 6/2018

OTHER PUBLICATIONS

JP-2014027268-A english translation (Year: 2014).*

* cited by examiner

*Primary Examiner* — Sally A Merkling
*Assistant Examiner* — Ricardo D Morales
(74) *Attorney, Agent, or Firm* — Oliff PLC

(57) ABSTRACT

To provide an R-T-B based permanent magnet having a high residual magnetic flux density Br at room temperature and a high coercivity HcJ at high temperature. In the R-T-B based permanent magnet, R is a rare earth element, T is an iron group element, and B is boron, and the R-T-B based permanent magnet includes a light rare earth element and a heavy rare earth element as R. The R-T-B based permanent magnet further includes Al, Ga, and Zr. With respect to 100 mass % of the R-T-B based permanent magnet, a total content of R is 28.50 mass % to 30.25 mass % (not including 28.50 mass %), B content is 0.93 mass % to 0.98 mass %, Al content is 0.03 mass % to 0.19 mass %, Ga content is 0.03 mass % to 0.15 mass %, and Zr content is 0.30 mass % to 0.50 mass %.

6 Claims, 1 Drawing Sheet

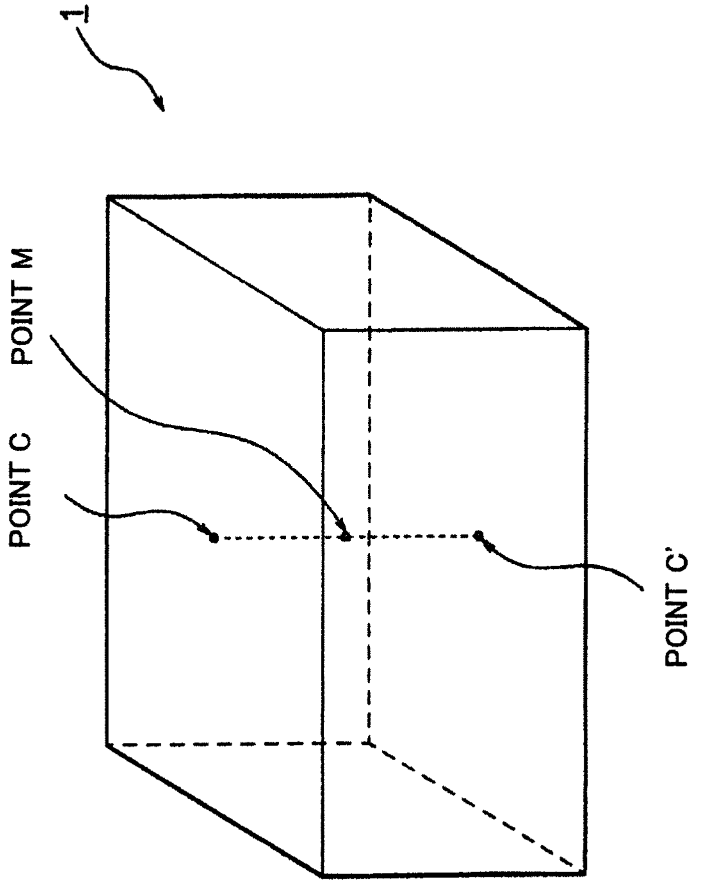
1
POINT M
POINT C
POINT C'

R-T-B BASED PERMANENT MAGNET AND MOTOR

TECHNICAL FIELD

The present disclosure relates to an R-T-B based permanent magnet and a motor.

BACKGROUND

Patent Document 1 discloses an R-T-B based permanent magnet having a high residual magnetic flux density and a high coercivity at room temperature. In Patent Document 1, a heavy rare earth element is diffused to grain boundaries, thereby the coercivity is improved.

[Patent Document 1] JP Patent Application Laid Open No. 2018-93202

SUMMARY

An object of an aspect of the present invention is to provide an R-T-B based permanent magnet having a high residual magnetic flux density Br at room temperature and a high coercivity HcJ at high temperature.

In response to the above object, the R-T-B based permanent magnet according to an aspect of the present invention is an R-T-B based permanent magnet in which R is a rare earth element, T is an iron group element, and B is boron; wherein the R-T-B based permanent magnet includes a light rare earth element and a heavy rare earth element as R;

the R-T-B based permanent magnet further includes Al, Ga, and Zr; and with respect to 100 mass % of the R-T-B based permanent magnet, a total content of R is 28.50 mass % to 30.25 mass % (not including 28.50 mass %), B content is 0.93 mass % to 0.98 mass %, Al content is 0.03 mass % to 0.19 mass %, Ga content is 0.03 mass % to 0.15 mass %, and Zr content is 0.30 mass % to 0.50 mass %.

The R-T-B based permanent magnet according to an aspect of the present invention attains a high Br and a high HcJ at high temperature by satisfying the above-mentioned characteristics.

In the R-T-B based permanent magnet, a total content of the light rare earth element may be 28.50 mass % to 29.50 mass % and a total content of the heavy rare earth element may be 0 mass % to 0.75 mass % (not including 0 mass %).

The R-T-B based permanent magnet may include Pr and Pr content may be 0.01 mass % to 1.00 mass %.

The R-T-B based permanent magnet may not substantially include Pr.

The R-T-B based permanent magnet may have a concentration gradient of the heavy rare earth element decreasing from a surface of the R-T-B based permanent magnet towards an inner side of the R-T-B based permanent magnet.

A motor according to another aspect of the present invention includes the above-mentioned R-T-B based permanent magnet.

BRIEF DESCRIPTION OF THE DRAWING

FIGURE is a schematic diagram of an R-T-B based permanent magnet.

DETAILED DESCRIPTION

Hereinafter, an R-T-B based permanent magnet according to an embodiment of the present invention will be described.

<R-T-B Based Permanent Magnet>

The R-T-B based permanent magnet includes main phase grains made of crystal grains having an $R_2T_{14}B$ type crystal structure. Further, the R-T-B based permanent magnet includes grain boundaries formed between two or more adjacent main phase grains.

The R-T-B based permanent magnet includes a rare earth element (R), boron (B), aluminum (Al), gallium (Ga), and zirconium (Zr) each of which are controlled within a predetermined composition range; thereby Br at room temperature and HcJ at high temperature can be improved.

R is classified into a light rare earth element (RL) and a heavy rare earth element (RH). RL included in the R-T-B based permanent magnet may be scandium (Sc), yttrium (Y), lanthan (La), cerium (Ce), praseodymium (Pr), neodymium (Nd), samarium (Sm), and europium (Eu); and RH may be gadolinium (Gd), terbium (Tb), dysprosium (Dy), holmium (Ho), erbium (Er), thulium (Tm), ytterbium (Yb), and lutetium (Lu). The R-T-B based permanent magnet includes RL and RH as R.

R may include at least one selected from Nd and Pr, and may include at least one selected from Dy and Tb.

The R-T-B based permanent magnet may include at least Nd and Tb as R.

T is an iron group element. The R-T-B based permanent magnet may include at least Fe as T. The R-T-B based permanent magnet may include only Fe as T or a combination of Fe and Co as T.

In the R-T-B based permanent magnet, boron included in B site may be partially substituted to carbon (C).

R content (TRE) in the R-T-B based permanent magnet is 28.50 mass % to 30.25 mass % (not including 28.50 mass %) with respect to 100 mass % of the R-T-B based permanent magnet. R content may be 28.84 mass % to 29.81 mass %, and it may be 29.14 mass % to 29.41 mass %. When TRE is too small, a sinterability tends to easily deteriorate. When TRE is too large, Br tends to easily decrease.

RL content (TRL) in the R-T-B based permanent magnet is not particularly limited. TRL may be 28.50 mass % to 29.50 mass %, and may be 28.84 mass % to 29.11 mass % with respect to 100 mass % of the R-T-B based permanent magnet.

The R-T-B based permanent magnet may include Pr as R. Pr content may be 0.00 mass % to 10.00 mass % with respect to 100 mass % of the R-T-B based permanent magnet.

Pr content may be 0.01 mass % to 1.00 mass % with respect to 100 mass % of the R-T-B based permanent magnet. When Pr content is within the above-mentioned range, HcJ at room temperature and HcJ at high temperature tend to easily improve compared to the case of not substantially including Pr. Also, Br and HcJ at high temperature tend to easily improve compared to the case which includes Pr in a large amount.

The R-T-B based permanent magnet may not substantially include Pr. By referring "not substantially include Pr", it means that Pr content may be less than 0.01 mass % with respect to 100 mass % of the R-T-B based permanent magnet. When the R-T-B based permanent magnet does not substantially include Pr, Br tends to easily improve compared to the case which includes Pr.

Pr content may be 5.00 mass % to 10.00 mass % with respect to 100 mass % of the R-T-B based permanent magnet. When Pr content is within the above-mentioned range, HcJ at room temperature tends to easily improve compared to the case which includes Pr in a small amount.

RH content (TRH) in the R-T-B based permanent magnet is not particularly limited. RH content may be 0 mass % to 0.75 mass % (not including 0 mass %), and may be 0.30 mass % to 0.75 mass % with respect to 100 mass % of the R-T-B based permanent magnet. RH included in the R-T-B based permanent magnet may be substantially Tb only. As TRH decreases, Br tends to easily improve; and as TRH increases, HcJ tends to easily improve. Since RH is expensive, as TRH decreases, the R-T-B based permanent magnet can be produced at a lower cost.

Co content may be 0.30 mass % to 3.0 mass % with respect to 100 mass % of the R-T-B based permanent magnet. Even when Co content, which is an expensive material, is decreased, the R-T-B based permanent magnet having a high corrosion resistance can be obtained. As a result, the R-T-B based permanent magnet having a high corrosion resistance can be obtained at a low cost. When Co content is too small, the corrosion resistance tends to easily decrease. When Co content is too large, the effect of enhancing the corrosion resistance may level off and also the cost for producing the R-T-B based permanent magnet increases.

Fe content is substantially a balance of the R-T-B based permanent magnet. By referring "substantially a balance", it means a balance excluding the aforementioned R and Co; and below mentioned B, Al, Ga, Zr, Mn, Cu, and other elements.

B content in the R-T-B based permanent magnet is 0.93 mass % to 0.98 mass % with respect to 100 mass % of the R-T-B based permanent magnet. When B content is either too small or too large, HcJ at high temperature tends to easily decrease.

The R-T-B based permanent magnet further includes Al, Ga, and Zr. When Al content, Ga content, and Zr content are within the following ranges respectively, excellent effects shown in below can be obtained.

Al content is 0.03 mass % to 0.19 mass % with respect to 100 mass % of the R-T-B based permanent magnet. Al content may be 0.05 mass % to 0.10 mass %, and it may be 0.05 mass % to 0.09 mass %. When Al content is too small, HcJ at high temperature tends to decrease easily. When Al content is too large, Br tends to decrease easily.

Ga content is 0.03 mass % to 0.15 mass % with respect to 100 mass % of the R-T-B based permanent magnet. Ga content may be 0.06 mass % to 0.10 mass %. When Ga content is too small, HcJ at high temperature tends to decrease easily. When Ga content is too large, Br and HcJ at high temperature tend to decrease easily.

Zr content is 0.30 mass % to 0.50 mass % with respect to 100 mass % of the R-T-B based permanent magnet. When Zr content is too small, HcJ at high temperature tends to easily decrease. When Zr content is too large, Br and HcJ at high temperature tend to easily decrease.

The R-T-B based permanent magnet may further include Mn and/or Cu.

Mn content is not particularly limited, and Mn may not be included. When Mn is included, Mn content may be 0.02 mass % to 0.10 mass %. By having Mn content within the above-mentioned range, Br and HcJ at high temperature can be improved.

Cu content is not particularly limited, and Cu may not be included. When Cu is included, Cu content may be 0.10 mass % to 0.55 mass %. By having Cu content within the above-mentioned range, Br and HcJ at high temperature tend to easily improve.

The R-T-B based permanent magnet may include other elements besides the above-mentioned R, T, B, Al, Ga, Zr, Mn, and Cu. A content of other elements is not particularly limited as long as the content of other elements does not significantly influence the magnetic properties of the R-T-B based permanent magnet. For example, the content of other elements may be 1.0 mass % or less in total with respect to 100 mass % of the R-T-B based permanent magnet. Note that, a total content of rare earth elements other than Nd, Pr, Dy, and Tb may be 0.3 mass % or less.

In below, as examples of other elements, C content, nitrogen (N) content, and oxygen (O) content are described.

C content in the R-T-B based permanent magnet may be 600 ppm to 1100 ppm with respect to the R-T-B based permanent magnet. By having 1100 ppm or less of C content, HcJ tends to easily improve. A production of an R-T-B based permanent magnet having less than 600 ppm of C content makes process conditions of the R-T-B based permanent magnet more difficult. Hence, it is difficult to produce the R-T-B based permanent magnet having less than 600 ppm of C content at a low cost.

N content in the R-T-B based permanent magnet may be 250 ppm to 700 ppm with respect to the R-T-B based permanent magnet. By having 700 ppm or less of N content, HcJ tends to easily improve. A production of an R-T-B based permanent magnet having less than 250 ppm of N content makes process conditions of the R-T-B based permanent magnet more difficult. Hence, it is difficult to produce the R-T-B based permanent magnet having less than 250 ppm of N content at a low cost.

0 content in the R-T-B based permanent magnet may be 350 ppm to 1000 ppm with respect to the R-T-B based permanent magnet. A production of an R-T-B based permanent magnet having less than 350 ppm of O content makes process conditions of the R-T-B based permanent magnet more difficult. Hence, it is difficult to produce the R-T-B based permanent magnet having less than 350 ppm of O content at a low cost.

Note that, as a method for measuring various components included in the R-T-B based permanent magnet, conventionally and generally known methods can be used. A content of each of various elements can be measured, for example, by fluorescence X-ray analysis, an inductively coupled plasma emission spectroscopic analysis (ICP analysis), and the like. O content is measured, for example, by an inert gas fusion-non-dispersive infrared absorption method. C content is measured, for example, by a combustion in oxygen stream-infrared absorption method. N content is measured, for example, by an inert gas fusion-thermal conductivity method.

Particularly, when Al content is 0.05 mass % to 0.09 mass %,

R content (TRE) may be 28.50 mass % to 30.25 mass % (not including 28.50 mass %), RL content (TRL) may be 28.50 mass % to 29.81 mass %, RH content (TRH) may be 0 mass % to 0.75 mass % (not including 0 mass %), Co content may be 0.30 mass % to 3.00 mass %, B content may be 0.93 mass % to 0.98 mass %, Ga content may be 0.03 mass % to 0.15 mass %, Zr content may be 0.30 mass % to 0.50 mass %, Mn content may be 0.02 mass % to 0.10 mass %, and Cu content may be 0.10 mass % to 0.55 mass %.

Further, when Al content is 0.05 mass % to 0.09 mass %,

C content may be 600 ppm to 1000 ppm,

N content may be 250 ppm to 700 ppm, and

O content may be 350 ppm to 1000 ppm.

A shape of the R-T-B based permanent magnet is not particularly limited. For example, the shape may be a rectangular parallelepiped shape.

In the R-T-B based permanent magnet, a concentration of RH may have a concentration gradient which decreases towards inner side from outer side of the R-T-B based permanent magnet 1. A type of RH having the above-mentioned concentration gradient is not particularly limited. For example, it may be Dy and/or Tb, or it may only be Tb.

Specifically, as shown in the FIGURE, the R-T-B based permanent magnet 1 having a rectangular parallelepiped shape has a surface portion and a center portion. RH content at the surface portion can be higher by 2% or more, 5% or more, and 10% or more than RH content at the center portion. Note that, the surface portion means the surface of the R-T-B based permanent magnet 1. For example, POINT C, C' shown in the FIGURE (C and C' each represents a center of gravity at two surfaces opposing against each other as shown in the FIGURE) is the surface portion. The center portion means the center of the R-T-B based permanent magnet 1. For example, the center portion means a portion which is half the thickness of the R-T-B based permanent magnet 1. For example, POINT M shown in the FIGURE (a middle point between POINT C and POINT C') is a center portion. Note that, POINT C, C' of the FIGURE may be the center of gravity of the surface having the largest area among the surfaces of the R-T-B based permanent magnet 1; and may be the center of gravity of the surface facing the largest surface.

A method of forming the concentration gradient of RH in the R-T-B based permanent magnet is not particularly limited. For example, due to the grain boundary diffusion of RH as described in below, the R-T-B based permanent magnet can have the concentration gradient of RH.

Also, the main phase grains of the R-T-B based permanent magnet may be core-shell grains, in which each core-shell grain has a core which is center part of main phase grain and a shell covering the core. Further, RH may exist at least in the shell; Dy or Tb may exist in the shell; and Tb may exist in the shell.

By having RH in the shell, the magnetic properties of the R-T-B based permanent magnet can be improved efficiently.

The shell is defined as a part where RH/RL, which is a molar ratio of RH to RL, is two times or more of RH/RL at the core.

A thickness of the shell is not particularly limited, and an average thickness of the shell may be 500 nm or less. Also, grain sizes of the main phase grains are not particularly limited, and an average grain size may be 1.0 μm or more and 6.5 μm or less.

A method of forming the main phase grains to have the above-mentioned core-shell grains is not particularly limited, for example, may be grain boundary diffusion described below. As RH diffuses to the grain boundaries and RH substitutes R in the surface of the main phase grains, the shell having a high ratio of RH is formed, and the above-mentioned core-shell grains are formed.

Hereinafter, a manufacturing method of the R-T-B based permanent magnet will be described in detail, however, it is not limited to the below described method and other known methods can be used.

[Preparation Step of Raw Material Powder]

A raw material powder can be prepared by a known method. A single alloy method using a single alloy will be described in below, however, a so-called two alloys method may be used in which two or more alloys having different compositions are mixed to prepare the raw material powder.

First, a raw material alloy of the R-T-B based permanent magnet is prepared (an alloy preparation step). In the alloy preparation step, raw material metals corresponding to the composition of the R-T-B based permanent magnet are melted by a known method, and then casting is carried out; thereby the raw material alloy having desired composition is prepared.

As raw material metals, metals such as a simple rare earth element; a simple metal element such as Fe, Co, Cu, and the like; alloys made of plurality of types of elements (for example, Fe—Co alloy), or compounds made of plurality of types of elements (for example, ferroboron); and the like can be used. A casting method for forming a raw material alloy from the raw material metals is not particularly limited. In order to obtain the R-T-B based permanent magnet having high magnetic properties, a strip casting method may be used. A homogenization treatment may be performed to the obtained raw material alloy by a known method as necessary.

After preparing the raw material alloy, it is pulverized (a pulverization step). An atmosphere of each step from the pulverization step to the sintering step can be a low oxygen concentration atmosphere to obtain higher magnetic properties. For example, the oxygen concentration in the atmosphere of each step may be 200 ppm or less. By controlling the oxygen concentration of the atmosphere of each step, O content in the R-T-B based permanent magnet can be controlled.

Below describes a two-step process as the pulverization step that includes a coarse pulverization step of pulverizing the alloy to a particle size of about several hundred μm to several mm; and a fine pulverization step of finely pulverizing the powder after coarse pulverization to a particle size of about several μm. However, a single-step process consisting solely of a fine pulverization step may be carried out.

In the coarse pulverization step, the raw material alloy is coarsely pulverized till the particle size becomes approximately several hundred μm to several mm. Thereby, a coarsely pulverized powder is obtained. A method of coarse pulverization is not particularly limited, and it can be a known method such as a hydrogen storage pulverization method, a method using a coarse pulverizer, and the like. In case of performing the hydrogen storage pulverization, N content in the R-T-B based permanent magnet can be controlled by controlling a nitrogen gas concentration in an atmosphere during the dehydrogenation treatment.

Next, the obtained coarsely pulverized powder is finely pulverized till the average particle size becomes several μm or so (a fine pulverization step). Thereby, a finely pulverized powder (raw material powder) is obtained. The average particle size of the finely pulverized powder may be 1 μm or more and 10 μm or less, 2 μm or more and 6 μm or less, or 2 μm or more and 4 μm or less. N content in the R-T-B based permanent magnet can be controlled by controlling a nitrogen gas concentration in the atmosphere during the fine pulverization step.

A method of fine pulverization is not particularly limited. For example, various kinds of fine pulverizers can be used for the fine pulverization.

When the coarsely pulverized powder is finely pulverized, by adding various pulverization aids such as lauramide, oleic amide, and the like, the finely pulverized powder having crystal particles which tends to easily orient to specific direction can be obtained when the finely pulverized powder is pressurized and compacted in the magnetic field. In addition, C content in the R-T-B based permanent magnet can be controlled by varying an added amount of the pulverization aid.

[Compacting Step]

In a compacting step, the above-mentioned finely pulverized powder is compacted to a desired shape. A compacting method is not particularly limited. For example, the above-mentioned finely pulverized powder may be filled in a die and pressurized in a magnetic field. A green compact obtained by the compacting step has crystal particles oriented in a specific direction. Hence, the R-T-B based permanent magnet with even higher Br can be obtained.

Pressure of 20 MPa or more and 300 MPa or less can be applied during compacting. Magnetic field of 950 kA/m or more can be applied, and 950 kA/m or more and 1600 kA/m or less can be applied. The applied magnetic field is not limited to a static magnetic field, and it can be a pulse magnetic field. Also, the static magnetic field and the pulse magnetic field can be used together.

As a compacting method, other than dry compacting in which the finely pulverized powder is directly compacted as described in above, wet compacting can be applied in which a slurry obtained by dispersing the finely pulverized powder in a solvent such as oil is compacted.

A shape of the green compact obtained by compacting the finely pulverized powder is not particularly limited. Also, density of the green compact at this time can be 3.7 $Mg/m^3$ to 4.5 $Mg/m^3$.

[Sintering Step]

A sintering step is a process in which the green compact is sintered in a vacuumed or inert gas atmosphere to obtain a sintered body. Sintering conditions need to be adjusted depending on conditions such as a composition, a pulverization method, an average of particle size, particle size distribution, and the like. For example, sintering is carried out by heating the green compact in a vacuumed or inert gas atmosphere, at 1000° C. or higher and 1200° C. or lower for one hour or more to 20 hours or less. By sintering under the above-mentioned sintering conditions, the sintered body with high density can be obtained. The sintered body having density of 7.45 $Mg/m^3$ or more is obtained. The density of the sintered body can be 7.50 $Mg/m^3$ or more. Note that, the density of the sintered body is the same as the density of the R-T-B based permanent magnet of after a grain boundary diffusion step which is described in below.

[Aging Treatment Step]

An aging treatment step is a step in which the sintered body is carried out with a heat treatment at lower temperature than the sintering temperature (aging treatment). There is no particular limitation as whether to carry out the aging treatment step, and the number of times of carrying out the aging treatment step is also not particularly limited. The aging treatment step can be adjusted accordingly depending on the desired magnetic properties. Also, the grain boundary diffusion step which is described in below may be used as the aging treatment step. Hereinafter, the embodiment of carrying out the two-step aging treatment is described.

A first-time aging step is referred as a first aging step, a second-time aging step is referred as a second aging step. The aging temperature of the first aging step is referred as T1, and the aging temperature of the second aging step is referred as T2.

T1 and the aging time during the first aging step are not particularly limited. T1 may be 700° C. or higher and 900° C. or lower. The aging time can be one hour or more and 10 hours or less.

T2 and the aging time during the second aging step are not particularly limited. T2 may be 450° C. or higher and 700° C. or lower. The aging time can be one hour or more and 10 hours or less.

By such aging treatments, the magnetic properties, especially HcJ of the R-T-B based permanent magnet obtained at the end can be improved.

[Machining Step (Before Grain Boundary Diffusion)]

A step for machining the sintered body to attain a desired shape may be performed if necessary. As examples of the machining method, a shape machining such as cutting and grinding, a chamfering such as barrel polishing, and the like may be mentioned.

[Grain Boundary Diffusion Step]

A grain boundary diffusion step can be performed by applying a diffusing material to the surface of the sintered body and heating the sintered body to which the diffusing material has been applied. Thereby, the R-T-B based permanent magnet having an improved HcJ can be obtained. A type of the diffusing material is not particularly limited. The diffusing material may include RH (for example, Tb and/or Dy), and the diffusing material may include all of the below mentioned first to third components. The first component is a hydride of Tb and/or a hydride of Dy. The second component is a hydride of Nd and/or a hydride of Pr. The third component is a simple Cu, an alloy including Cu, and/or a compound including Cu.

Nd and/or Pr included in the second component and Cu included in the third component have a lower melting point than Tb and/or Dy included in the first component. Therefore, the second and third components diffuse to the grain boundaries before the first component. Particularly, the second and the third components diffuse to two-grain boundaries (grain boundary existing between two main phase grains) before the first component. As the second and third components diffuse to the two-grain boundaries before the first component, the first component becomes easier to diffuse to the two-grain boundaries. Therefore, compared to the case that the diffusing material only includes the first component, Tb and/or Dy can diffuse to the two-grain boundaries at a lower temperature and in a shorter time when the diffusing material includes all of the first to third components. As a result, compared to the case that the diffusing material includes only the first component, the temperature necessary for diffusion of Tb and/or Dy can be lowered and the time necessary for diffusion can be shortened. Also, excess diffusion of Tb and/or Dy to the inner side of the main phase grains is restricted. Note that, in case the diffusing material includes the first component with both the second and third components, Tb and/or Dy tend to easily diffuse to the two-grain boundaries compared to the case that the diffusing material includes the first component with either one of the second and third components.

The diffusing material may be a slurry including a solvent in addition to the above mentioned first to third components. The solvent included in the slurry may be any solvent other than water. For example, it may be organic solvents such as alcohols, aldehydes, ketones, and the like. The diffusing material may include a binder. A type of the binder is not particularly limited. For example, resins such as acrylic resins and the like may be included as the binder. By including the binder, the diffusing material becomes easier to apply on the surface of the sintered body.

The diffusing material may be a paste including the solvent and the binder in addition to the above-mentioned first to third components. The paste has fluidity and high viscosity. The viscosity of the paste is higher than the viscosity of the slurry.

The solvent may be removed before the grain boundary diffusion by drying the sintered body applied with the slurry or the paste.

A diffusion treatment temperature during the grain boundary diffusion step may be 800° C. or higher and 950° C. or lower. In the grain boundary diffusion step, a heating rate from lower temperature than the diffusion treatment temperature to the diffusion temperature can be set slower. For example, the temperature lower than the diffusion treatment may be 500° C. or so. In this case, when temperature is 600° C. or so, Nd and/or Pr included in the main phase grains move into the grain boundaries, and Nd rich phase and/or Pr rich phase which are liquid phases tend to easily form. As a result, in the temperature of 800° C. or so, the hydride of Tb and/or the hydride of Dy, which are the first component, tend to easily dissolve.

The holding time that the sintered body is maintained at the diffusion treatment temperature is defined as the diffusion treatment time, and the diffusion treatment time may be 1 hour or longer and 50 hours or shorter. Also, the atmosphere during the grain boundary diffusion step may be a non-oxidizing atmosphere for example a noble gas atmosphere such as argon and the like. Note that, the grain boundary diffusion step may also be carried out as the aforementioned aging treatment step.

Also, after the diffusion treatment, a heat treatment may be further performed. A heat treatment temperature in the case may be 450° C. or higher and 600° C. or lower. A heat treatment time may be 1 hour or longer and 10 hours or shorter. By carrying out the heat treatment, the magnetic properties, especially HcJ, of the R-T-B based permanent magnet obtained at the end can be improved.

[Machining Step (After Grain Boundary Diffusion)]

After the grain boundary diffusion step, polishing may be carried out in order to remove the diffusing material remaining on the surface of the R-T-B based permanent magnet. Also, the R-T-B based permanent magnet may be subjected to other machining. For example, shape machining such as cutting and grinding, chamfering such as barrel polishing, and the like may be carried out.

In the above-mentioned production method, the machining steps are carried out before and after the grain boundary diffusion, however, these steps do not necessarily have to be performed. Also, the grain boundary diffusion step may be carried out as the aging treatment step. A heating temperature in case the grain boundary diffusion step is carried out as the aging treatment step is not particularly limited. It is particularly preferable to perform the grain boundary diffusion step at a preferable temperature and also to perform the aging treatment step at a preferable temperature.

A concentration of RH of the R-T-B based permanent magnet after the grain boundary diffusion tends to have a concentration gradient which decreases from the outer side towards the inner side of the R-T-B based permanent magnet. The main phase grains included in the R-T-B based permanent magnet after the grain boundary diffusion tend to easily have the above-mentioned core-shell structure.

The R-T-B based permanent magnet obtained through the step has the desired properties. Specifically, the R-T-B based permanent magnet obtained through the step has excellent Br and HcJ at high temperature.

By magnetizing the R-T-B based permanent magnet obtained by the above method, a magnetic R-T-B based permanent magnet product is obtained.

The above-mentioned R-T-B based permanent magnet is suitably used for motors, generators, and the like. Particularly, it is suitably used for a motor driven under high electric current and frequency.

When the conventional R-T-B based permanent magnet is used for a motor driven under high electric current and frequency, a high temperature may be applied to the R-T-B based permanent magnet, or the R-T-B based permanent magnet itself may generate heat. As a result, HcJ decreases and demagnetization due to a demagnetizing field tends to easily occur. Also, the R-T-B based permanent magnet having a high HcJ at room temperature has Br which tends to easily decrease.

When the above-mentioned R-T-B based permanent magnet according to the present embodiment is used for a motor driven under high electric current and frequency, even in case a high temperature is applied to the R-T-B based permanent magnet, or in case the R-T-B based permanent magnet itself generates heat, demagnetization due to demagnetizing field rarely occurs since HcJ is high at high temperature. Further, since Br is also high, a maximum energy product at high temperature increases. Therefore, a motor including the above-mentioned R-T-B based permanent magnet according to the present embodiment can attain a high output particularly when it is driven under high electric current and frequency.

Note that, the present invention is not limited to the above-described embodiment and can be variously modified within the scope of the present invention.

The method for producing the R-T-B based permanent magnet is not limited to the above method, and may be suitably changed. The method for producing the above-mentioned R-T-B based permanent magnet is a method for producing by sintering, however, for example, the R-T-B based permanent magnet may be produced by hot working. A method for producing the R-T-B based permanent magnet by hot working includes the following steps:

(a) a melting and quenching step to obtain a ribbon by melting raw material metals and quenching the resulting molten metal;
(b) a pulverization step to obtain a flake-like raw material powder by pulverizing the ribbon;
(c) a cold forming step for cold-forming the pulverized raw material powder;
(d) a preheating step for preheating the cold-formed body;
(e) a hot forming step for hot-forming the preheated cold-formed body;
(f) a hot plastic deforming step for plastically deforming the hot-formed body into a predetermined shape; and
(g) an aging treatment step for aging the R-T-B based permanent magnet.

Note that, steps after the aging treatment step are the same as the method for producing by sintering.

EXAMPLES

Hereinafter, the present embodiment is described based on further detailed examples, however, the present invention is not to be limited thereto.

(Production of R-T-B Based Permanent Magnet)

A raw material alloy was produced by a strip casting method so that an R-T-B based permanent magnet obtained at the end satisfied a composition of each sample shown in Tables 1 and 2 described in below. In some cases, H, Si, Ca, La, Ce, Cr, and the like may be detected as other elements not indicated in Tables 1 and 2. Si was mixed mainly from ferroboron raw material and a crucible while melting an alloy. Ca, La, and Ce were mixed from a rare earth element raw material. Also, Cr may be mixed from electrolytic iron. Fe content in Tables 1 and 2 was indicated as "Bal." since Fe content was a balance when the R-T-B based permanent magnet including the above-mentioned other elements was 100 mass %.

Subsequently, hydrogen was stored into the raw material alloy by flowing hydrogen gas at room temperature for one hour. Then, the atmosphere was changed to Ar gas and a dehydrogenation treatment was performed at 600° C. for one hour to perform a hydrogen storage pulverization to the raw material alloy.

Next, to the raw material alloy powder, a mass ratio of 0.1% oleic amide was added as a pulverization aid and mixed using a Nauta mixer.

Subsequently, the obtained powder was finely pulverized in a nitrogen gas stream using an impact plate type jet mill apparatus, and the fine powder (raw material powder) having an average particle size of 3.5 μm or so was obtained. Note that, the average particle size was an average particle size D50 measured by a laser diffraction type particle size analyzer.

The obtained fine powder was compacted in the magnetic field and a green compact was manufactured. Here, the magnetic field applied to the obtained fine powder during compacting was a static magnetic field of 1200 kA/m. The pressure applied during compacting was 120 MPa. The direction of applied magnetic field and the direction of pressurization were perpendicular to each other.

Subsequently, the green compact was sintered and a sintered body was obtained. Optimum conditions of sintering varied depending on the composition and the like; however, sintering was carried out within the temperature range of 1050° C. to 1100° C. for four hours. Sintering was carried out in a vacuumed atmosphere. Then, in Ar atmosphere under atmospheric pressure, the first aging treatment was performed at the first aging temperature T1=850° C. for one hour and the second aging treatment was further performed at the second aging temperature T2=520° C. to 560° C. for one hour.

(Production of Diffusing Material Paste)

Next, the diffusing material paste used for the grain boundary diffusion was produced.

First, a metal Tb having a purity of 99.9% was subjected to a hydrogen storage by flowing hydrogen gas. Then, the atmosphere was changed to Ar gas to perform a dehydrogenation treatment at 600° C. for 1 hour, and a hydrogen storage pulverization of the metal Tb was performed. Next, as a pulverization aid, 0.05 mass % of zinc stearate was added with respect to 100 mass % of the metal Tb and then mixed using a Nauta mixer. Then, a fine pulverization was carried out using a jet mill in the atmosphere including 3000 ppm of oxygen, thereby a finely pulverized powder of Tb hydride having an average particle size of 10.0 μm or so was obtained.

Next, a finely pulverized powder of Nd hydride having an average particle size of 10.0 μm or so was obtained from a metal Nd having a purity of 99.9%. A method of obtaining the finely pulverized powder of Nd hydride was the same as the method of obtaining the finely pulverized powder of Tb hydride.

46.8 parts by mass of the finely pulverized powder of Tb hydride, 17.0 parts by mass of the finely pulverized powder of Nd hydride, 11.2 parts by mass of a metal Cu powder, 23 parts by mass of alcohol, and 2 parts by mass of acrylic resin were kneaded to produce the diffusing material paste. The alcohol was a solvent and the acrylic resin was a binder.

(Applying of Diffusing Material Paste and Heating Treatment)

The above-mentioned sintered body was ground to a size of vertical length 11 mm×horizontal length 11 mm×thickness 4.2 mm (the direction of easy magnetization axis was 4.2 mm). Then, it was immersed for 3 minutes in a mixed solution of nitric acid and ethanol in a ratio of 3 parts by mass of nitric acid with respect to 100 parts by mass of ethanol, and then immersed in ethanol for 1 minute, thereby an etching treatment was performed. The etching treatment of immersing in the mixed solution for 3 minutes and then immersing in ethanol for 1 minute was performed twice.

Next, the entire surface of the sintered body after the etching treatment was applied with the above-mentioned diffusing material paste. The diffusing material paste was applied in an amount so that the composition of the R-T-B based permanent magnet obtained at the end satisfied the compositions shown in Tables 1 and 2.

Next, the sintered body coated with the diffusing material paste was put in an oven at 160° C. to remove the solvent in the diffusing material paste. Then, while flowing Ar under atmospheric pressure (1 atm), it was heated for 18 hours at 930° C. Further, while flowing Ar under atmospheric pressure, the sintered body was heated for 4 hours at 520 to 560° C. Thereby, the R-T-B based permanent magnet of each sample shown in Tables 1 and 2 was obtained.

The surface of the R-T-B based permanent magnet after grain boundary diffusion was ground by 0.1 mm per each surface, then the composition, the sinterability, and the magnetic properties were evaluated.

An average composition of each obtained R-T-B based permanent magnet was measured. Each sample was pulverized using a stamp mill. A content of each of various elements was measured using fluorescence X-ray analysis. B content was measured using ICP analysis. O content was measured by an inert gas fusion-non-dispersive infrared absorption method. C content was measured by a combustion in oxygen stream-infrared absorption method. N content was measured by an inert gas fusion-thermal conductivity method. The composition of the R-T-B based permanent magnet was confirmed to have the same composition as shown in Tables 1 and 2.

The sinterability was evaluated by measuring density of each experiment example. When the density was 7.45 $Mg/m^3$ or more, the sinterability was considered good, and when it was less than 7.45 $Mg/m^3$, the sinterability was considered poor. For the experiment examples having a poor sinterability, the magnetic properties were not measured.

The R-T-B based permanent magnet was ground to a size of vertical length 11 mm×horizontal length 11 mm×thickness 4.2 mm (the direction of easy magnetization axis was 4.2 mm) by a vertical grinding machine, and the magnetic properties at room temperature were evaluated by a BH tracer. Note that, the R-T-B based permanent magnet was magnetized by a pulse magnetic field of 4000 kA/m before the measurement of the magnetic properties. Since the R-T-B based permanent magnet was thin, three magnets were stacked and the magnetic properties were evaluated. In the present examples, HcJ at room temperature and HcJ at 160° C. were measured.

Note that, in the present examples, when Br at room temperature of the R-T-B based permanent magnet was 1475 mT or more, it was considered good; and when Br at room temperature of the R-T-B based permanent magnet was 1490 mT or more, it was considered even better. Further, when HcJ at 160° C. of the R-T-B based permanent magnet was 690 kA/m or more, it was considered good; and when HcJ at 160° C. of the R-T-B based permanent magnet was 700 kA/m or more, it was considered even better.

When the R-T-B based permanent magnet had good Br at room temperature and good HcJ at 160° C., the magnetic properties of the R-T-B based permanent magnet were considered good. When at least one of Br at room temperature and HcJ at 160° C. were not good, then the R-T-B based permanent magnet was considered to have poor magnetic properties. Results are shown in Tables 1 and 2.

TABLE 1

| Sample No. | Example/ Comparative example | RL Nd (mass %) | RL Pr (mass %) | RL TRL (mass %) | RH Tb (mass %) | TRE (mass %) | B (mass %) | Al (mass %) | Ga (mass %) | Zr (mass %) | Mn (mass %) |
|---|---|---|---|---|---|---|---|---|---|---|---|
| 1 | Comparative example | 30.00 | 0.02 | 30.02 | 0.30 | 30.32 | 0.96 | 0.10 | 0.10 | 0.35 | 0.03 |
| 2 | Example | 29.49 | 0.01 | 29.50 | 0.30 | 29.81 | 0.96 | 0.10 | 0.10 | 0.35 | 0.03 |
| 3 | Example | 29.30 | 0.02 | 29.32 | 0.30 | 29.62 | 0.96 | 0.10 | 0.10 | 0.35 | 0.03 |
| 4 | Example | 29.10 | 0.01 | 29.11 | 0.30 | 29.41 | 0.96 | 0.10 | 0.10 | 0.35 | 0.03 |
| 5 | Example | 29.00 | 0.03 | 29.03 | 0.30 | 29.33 | 0.96 | 0.10 | 0.10 | 0.35 | 0.03 |
| 6 | Example | 28.90 | 0.02 | 28.92 | 0.30 | 29.22 | 0.96 | 0.10 | 0.10 | 0.35 | 0.03 |
| 7 | Example | 28.80 | 0.04 | 28.84 | 0.30 | 29.14 | 0.96 | 0.10 | 0.10 | 0.35 | 0.03 |
| 8 | Example | 28.46 | 0.04 | 28.50 | 0.30 | 28.84 | 0.96 | 0.10 | 0.10 | 0.35 | 0.03 |
| 9 | Comparative example | 28.00 | 0.01 | 28.01 | 0.30 | 28.31 | 0.96 | 0.10 | 0.10 | 0.35 | 0.03 |
| 10 | Example | 29.02 | 0.00 | 29.02 | 0.30 | 29.32 | 0.96 | 0.10 | 0.10 | 0.35 | 0.03 |
| 5 | Example | 29.00 | 0.03 | 29.03 | 0.30 | 29.33 | 0.96 | 0.10 | 0.10 | 0.35 | 0.03 |
| 11 | Example | 28.70 | 0.30 | 29.00 | 0.30 | 29.30 | 0.96 | 0.10 | 0.10 | 0.35 | 0.03 |
| 12 | Example | 28.00 | 1.00 | 29.00 | 0.30 | 29.30 | 0.96 | 0.10 | 0.10 | 0.35 | 0.03 |
| 13 | Example | 24.00 | 5.00 | 29.00 | 0.30 | 29.30 | 0.96 | 0.10 | 0.10 | 0.35 | 0.03 |
| 14 | Example | 21.60 | 7.40 | 29.00 | 0.30 | 29.30 | 0.96 | 0.10 | 0.10 | 0.35 | 0.03 |
| 15 | Example | 19.00 | 10.00 | 29.00 | 0.30 | 29.30 | 0.96 | 0.10 | 0.10 | 0.35 | 0.03 |
| 5 | Example | 29.00 | 0.03 | 29.03 | 0.30 | 29.33 | 0.96 | 0.10 | 0.10 | 0.35 | 0.03 |
| 16 | Example | 28.92 | 0.03 | 28.95 | 0.75 | 29.70 | 0.96 | 0.10 | 0.10 | 0.35 | 0.03 |

| Sample No. | Cu (mass %) | Co (mass %) | Fe (mass %) | C (ppm) | N (ppm) | O (ppm) | sinterability | Magnetic properties Br(RT) (mT) | Magnetic properties HcJ(RT) (kA/m) | Magnetic properties HcJ(160° C.) (kA/m) | Evaluation |
|---|---|---|---|---|---|---|---|---|---|---|---|
| 1 | 0.20 | 1.00 | Bal. | 907 | 510 | 509 | Good | 1463 | 1776 | 705 | Poor |
| 2 | 0.20 | 1.00 | Bal. | 902 | 503 | 504 | Good | 1476 | 1773 | 704 | Good |
| 3 | 0.20 | 1.00 | Bal. | 903 | 503 | 509 | Good | 1483 | 1773 | 704 | Good |
| 4 | 0.20 | 1.00 | Bal. | 901 | 501 | 501 | Good | 1491 | 1771 | 703 | Good |
| 5 | 0.20 | 1.00 | Bal. | 905 | 506 | 501 | Good | 1495 | 1770 | 703 | Good |
| 6 | 0.20 | 1.00 | Bal. | 902 | 502 | 502 | Good | 1496 | 1768 | 702 | Good |
| 7 | 0.20 | 1.00 | Bal. | 905 | 506 | 501 | Good | 1497 | 1765 | 701 | Good |
| 8 | 0.20 | 1.00 | Bal. | 908 | 509 | 506 | Good | 1503 | 1746 | 693 | Good |
| 9 | 0.20 | 1.00 | Bal. | 910 | 504 | 502 | Poor | Not measured | | | |
| 10 | 0.20 | 1.00 | Bal. | 910 | 509 | 506 | Good | 1497 | 1750 | 693 | Good |
| 5 | 0.20 | 1.00 | Bal. | 905 | 506 | 501 | Good | 1495 | 1770 | 703 | Good |
| 11 | 0.20 | 1.00 | Bal. | 902 | 506 | 507 | Good | 1493 | 1791 | 701 | Good |
| 12 | 0.20 | 1.00 | Bal. | 904 | 508 | 504 | Good | 1490 | 1800 | 700 | Good |
| 13 | 0.20 | 1.00 | Bal. | 909 | 504 | 505 | Good | 1481 | 1905 | 697 | Good |
| 14 | 0.20 | 1.00 | Bal. | 901 | 508 | 502 | Good | 1477 | 1919 | 694 | Good |
| 15 | 0.20 | 1.00 | Bal. | 906 | 509 | 505 | Good | 1476 | 1939 | 691 | Good |
| 5 | 0.20 | 1.00 | Bal. | 905 | 506 | 501 | Good | 1495 | 1770 | 703 | Good |
| 16 | 0.39 | 1.00 | Bal. | 908 | 504 | 504 | Good | 1485 | 1870 | 782 | Good |

TABLE 2

| Sample No. | Example/ Comparative example | RL Nd (mass %) | RL Pr (mass %) | RL TRL (mass %) | RH Tb (mass %) | TRE (mass %) | B (mass %) | Al (mass %) | Ga (mass %) | Zr (mass %) | Mn (mass %) |
|---|---|---|---|---|---|---|---|---|---|---|---|
| 21 | Comparative example | 29.01 | 0.00 | 29.01 | 0.30 | 29.31 | 1.00 | 0.10 | 0.10 | 0.35 | 0.03 |
| 22 | Example | 29.03 | 0.03 | 29.06 | 0.30 | 29.36 | 0.98 | 0.10 | 0.10 | 0.35 | 0.03 |
| 5 | Example | 29.00 | 0.03 | 29.03 | 0.30 | 29.33 | 0.96 | 0.10 | 0.10 | 0.35 | 0.03 |
| 23 | Example | 29.01 | 0.01 | 29.02 | 0.30 | 29.32 | 0.93 | 0.10 | 0.10 | 0.35 | 0.03 |
| 24 | Comparative example | 29.02 | 0.04 | 29.06 | 0.30 | 29.36 | 0.91 | 0.10 | 0.10 | 0.35 | 0.03 |
| 25 | Comparative example | 29.01 | 0.04 | 29.05 | 0.30 | 29.35 | 0.96 | 0.02 | 0.10 | 0.35 | 0.03 |
| 26 | Example | 29.04 | 0.02 | 29.06 | 0.30 | 29.36 | 0.96 | 0.03 | 0.10 | 0.35 | 0.03 |
| 27 | Example | 29.03 | 0.03 | 29.06 | 0.30 | 29.33 | 0.96 | 0.05 | 0.10 | 0.35 | 0.03 |
| 28 | Example | 29.01 | 0.05 | 29.06 | 0.30 | 29.31 | 0.96 | 0.09 | 0.10 | 0.35 | 0.03 |
| 5 | Example | 29.00 | 0.03 | 29.03 | 0.30 | 29.33 | 0.96 | 0.10 | 0.10 | 0.35 | 0.03 |
| 29 | Example | 29.02 | 0.04 | 29.06 | 0.30 | 29.36 | 0.96 | 0.19 | 0.10 | 0.35 | 0.03 |
| 30 | Comparative example | 29.01 | 0.03 | 29.04 | 0.30 | 29.34 | 0.96 | 0.25 | 0.10 | 0.35 | 0.03 |
| 31 | Comparative example | 29.03 | 0.03 | 29.06 | 0.30 | 29.36 | 0.96 | 0.10 | 0.02 | 0.35 | 0.03 |
| 32 | Example | 29.01 | 0.04 | 29.05 | 0.30 | 29.35 | 0.96 | 0.10 | 0.03 | 0.35 | 0.03 |
| 33 | Example | 29.02 | 0.03 | 29.05 | 0.30 | 29.32 | 0.96 | 0.10 | 0.06 | 0.35 | 0.03 |
| 34 | Example | 29.04 | 0.04 | 29.08 | 0.30 | 29.34 | 0.96 | 0.10 | 0.09 | 0.35 | 0.03 |
| 5 | Example | 29.00 | 0.03 | 29.03 | 0.30 | 29.33 | 0.96 | 0.10 | 0.10 | 0.35 | 0.03 |
| 35 | Example | 29.02 | 0.02 | 29.04 | 0.30 | 29.34 | 0.96 | 0.10 | 0.15 | 0.35 | 0.03 |
| 36 | Comparative example | 29.01 | 0.05 | 29.06 | 0.30 | 29.36 | 0.96 | 0.10 | 0.20 | 0.35 | 0.03 |
| 37 | Comparative example | 29.01 | 0.02 | 29.03 | 0.30 | 29.33 | 0.96 | 0.10 | 0.10 | 0.20 | 0.03 |
| 38 | Example | 29.02 | 0.05 | 29.07 | 0.30 | 29.37 | 0.96 | 0.10 | 0.10 | 0.30 | 0.03 |
| 5 | Example | 29.00 | 0.03 | 29.03 | 0.30 | 29.33 | 0.96 | 0.10 | 0.10 | 0.35 | 0.03 |
| 39 | Example | 29.01 | 0.03 | 29.04 | 0.30 | 29.34 | 0.96 | 0.10 | 0.10 | 0.50 | 0.03 |
| 40 | Comparative example | 29.00 | 0.03 | 29.03 | 0.30 | 29.33 | 0.96 | 0.10 | 0.10 | 0.60 | 0.03 |

| Sample No. | Cu (mass %) | Co (mass %) | Fe (mass %) | C (ppm) | N (ppm) | O (ppm) | sinterability | Magnetic properties Br(RT) (mT) | Magnetic properties HcJ(RT) (kA/m) | Magnetic properties HcJ(160° C.) (kA/m) | Evaluation |
|---|---|---|---|---|---|---|---|---|---|---|---|
| 21 | 0.20 | 1.00 | Bal. | 904 | 501 | 503 | Good | 1495 | 1729 | 671 | Poor |
| 22 | 0.20 | 1.00 | Bal. | 906 | 507 | 508 | Good | 1496 | 1759 | 693 | Good |
| 5 | 0.20 | 1.00 | Bal. | 905 | 506 | 501 | Good | 1495 | 1770 | 703 | Good |
| 23 | 0.20 | 1.00 | Bal. | 903 | 508 | 507 | Good | 1492 | 1781 | 698 | Good |
| 24 | 0.20 | 1.00 | Bal. | 901 | 502 | 510 | Good | 1489 | 1723 | 669 | Poor |
| 25 | 0.20 | 1.00 | Bal. | 907 | 507 | 503 | Good | 1510 | 1686 | 669 | Poor |
| 26 | 0.20 | 1.00 | Bal. | 905 | 501 | 505 | Good | 1505 | 1745 | 693 | Good |
| 27 | 0.20 | 1.00 | Bal. | 905 | 506 | 507 | Good | 1504 | 1762 | 696 | Good |
| 28 | 0.20 | 1.00 | Bal. | 902 | 504 | 502 | Good | 1503 | 1768 | 701 | Good |
| 5 | 0.20 | 1.00 | Bal. | 905 | 506 | 501 | Good | 1495 | 1770 | 703 | Good |
| 29 | 0.20 | 1.00 | Bal. | 908 | 504 | 508 | Good | 1483 | 1793 | 712 | Good |
| 30 | 0.20 | 1.00 | Bal. | 901 | 509 | 509 | Good | 1465 | 1801 | 715 | Poor |
| 31 | 0.20 | 1.00 | Bal. | 903 | 508 | 510 | Good | 1497 | 1730 | 687 | Poor |
| 32 | 0.20 | 1.00 | Bal. | 902 | 502 | 506 | Good | 1497 | 1757 | 697 | Good |
| 33 | 0.20 | 1.00 | Bal. | 906 | 506 | 505 | Good | 1496 | 1763 | 700 | Good |
| 34 | 0.20 | 1.00 | Bal. | 905 | 509 | 502 | Good | 1496 | 1769 | 702 | Good |
| 5 | 0.20 | 1.00 | Bal. | 905 | 506 | 501 | Good | 1495 | 1770 | 703 | Good |
| 35 | 0.20 | 1.00 | Bal. | 909 | 506 | 502 | Good | 1490 | 1759 | 698 | Good |
| 36 | 0.20 | 1.00 | Bal. | 906 | 510 | 507 | Good | 1470 | 1720 | 683 | Poor |
| 37 | 0.20 | 1.00 | Bal. | 903 | 510 | 509 | Good | 1493 | 1610 | 639 | Poor |
| 38 | 0.20 | 1.00 | Bal. | 907 | 505 | 508 | Good | 1494 | 1768 | 702 | Good |
| 5 | 0.20 | 1.00 | Bal. | 905 | 506 | 501 | Good | 1495 | 1770 | 703 | Good |
| 39 | 0.20 | 1.00 | Bal. | 901 | 507 | 510 | Good | 1493 | 1771 | 703 | Good |
| 40 | 0.20 | 1.00 | Bal. | 906 | 503 | 501 | Good | 1470 | 1766 | 685 | Poor |

Table 1 shows examples and comparative examples performed under the same conditions except for varying types of R and R content in the R-T-B based permanent magnet. Examples having the compositions within the specific ranges all exhibited good magnetic properties. On the other hand, Sample No. 1 in which TRE was too large, Br decreased. Sample No. 9 in which TRE was too small, the sinterability decreased.

Table 2 shows examples and comparative examples in which B content, Al content, Ga content, and Zr content in the R-T-B based permanent magnet was varied. Examples having the compositions within the specific ranges all exhibited good magnetic properties. On the other hand, comparative examples in which B content, Al content, Ga content, or Zr content was out of the specific ranges had decreased Br and/or HcJ at 160° C.

Note that, regarding each example and comparative example of the R-T-B based permanent magnet, Tb concentration gradient was measured using an electron probe micro analyzer (EPMA). As a result, it was confirmed that Tb concentration decreased from outer side to inner side of the magnet.

NUMERICAL REFERENCES

1 . . . R-T-B based permanent magnet

What is claimed is:

1. An R-T-B based permanent magnet in which R is a rare earth element, T is an iron group element, and B is boron; wherein the R-T-B based permanent magnet comprises a light rare earth element and a heavy rare earth element as R, the R-T-B based permanent magnet further comprises Al, Ga, and Zr; and with respect to 100 mass % of the R-T-B based permanent magnet, a total content of R is 28.50 mass % to 30.25 mass % (not including 28.50 mass %), B content is 0.93 mass % to 0.98 mass %, Al content is 0.03 mass % to 0.19 mass %, Ga content is 0.03 mass % to 0.15 mass %, and Zr content is 0.30 mass % to 0.50 mass %.

2. The R-T-B based permanent magnet according to claim 1, wherein a total content of the light rare earth element is 28.50 mass % to 29.50 mass %, and a total content of a heavy rare earth element is 0 mass % to 0.75 mass % (not including 0 mass %).

3. The R-T-B based permanent magnet according to claim 1, wherein the R-T-B based permanent magnet comprises Pr and Pr content is 0.01 mass % to 1.00 mass %.

4. The R-T-B based permanent magnet according to claim 1, wherein the R-T-B based permanent magnet does not substantially include Pr.

5. The R-T-B based permanent magnet according to claim 1 having a concentration gradient of the heavy rare earth element decreasing from a surface of the R-T-B based permanent magnet towards an inner side of the R-T-B based permanent magnet.

6. A motor comprising the R-T-B based permanent magnet according to claim 1.

* * * * *